US005980123A

United States Patent [19]

Heifler

[11] Patent Number: 5,980,123

[45] Date of Patent: Nov. 9, 1999

[54] SYSTEM AND METHOD FOR DETECTING AN INTRUDER

[75] Inventor: Nahy Heifler, Havazelet Hasharon, Israel

[73] Assignee: State of Israel/Ministry of Defense Armament Development Authority - Rafael, Haifa, Israel

[21] Appl. No.: 09/101,339

[22] PCT Filed: Jan. 8, 1997

[86] PCT No.: PCT/IL97/00014

§ 371 Date: Sep. 29, 1998

§ 102(e) Date: Sep. 29, 1998

[87] PCT Pub. No.: WO97/25696

PCT Pub. Date: Jul. 17, 1997

[30] Foreign Application Priority Data

Jan. 8, 1996 [IL] Israel ........................................ 116703

[51] Int. Cl.[6] ............................ G03B 17/00; G08B 15/00

[52] U.S. Cl. ........................... 396/427; 348/154; 340/567

[58] Field of Search ..................................... 396/419, 427; 348/143, 152, 153, 154, 155; 340/541, 565, 567; 250/DIG. 1

[56] References Cited

U.S. PATENT DOCUMENTS 5,448,320 9/1995 Sakai et al. ............................. 396/427
5,657,076 8/1997 Tapp ........................................ 348/154

FOREIGN PATENT DOCUMENTS 8-55286 2/1996 Japan .
2 250 156 5/1992 United Kingdom .

OTHER PUBLICATIONS

B.Bull, "Was kann man erwarten—was ist zu beachten?" *Protector*, vol. 19 No. 4, pp.33–41, Sep. 1991.

*Primary Examiner*—Howard B. Blankenship
*Attorney, Agent, or Firm*—Foley & Lardner

[57] ABSTRACT

A system and method for detecting an intruder into an area to be guarded is provided. The system includes a plurality of detection units, each of the plurality of detection units having at least one infrared sensor and having a first field of view external to and directed generally along the perimeter, and located within the area to be guarded. The infrared sensor may be a passive sensor. The detection units include a camera for recording intrusion within a second field of view and a controller. The controller is responsive to output of the infrared sensor, for determining when an intruder has entered the first field of view, whereupon an operator activates the camera.

21 Claims, 6 Drawing Sheets

17

15

SYSTEM AND METHOD FOR DETECTING AN INTRUDER

FIELD OF THE INVENTION

The present invention relates to systems for detecting intruders into a guarded area generally and to such systems which utilize infra red sensors combined with cameras in particular.

BACKGROUND OF THE INVENTION

Systems for protecting guarded areas and detecting intruders are known in the art. One example of a intruder detection system is an electrical or electronic fence which provides an alarm whenever there is an intrusion, since such a change indicates that the fence has been touched. Such systems only detect intrusion when the intruder enters or is about to cross a boundary or a guarded perimeter.

Various existing security systems are discussed in pages 33–41 of an article entitled "Was kann man erwarten—was ist zu beacten?" by Bernd Bull , published in vol 19, no 4 of the "Protector", September 1991 in Zurich.

Other detection systems use cameras which continually view the secured area. Any change in the view is visible to an operator providing he is continuously watching the screen. Such systems allow the operator to distinguish between the actual view and a pre-recorded view. Furthermore, the cameras need to be switched on all the time and during the hours of darkness require relatively expensive lighting or special night cameras.

Other detection systems actively search for intruders by continually scanning the area to be guarded. One example of a scanning system seeks to detect objects which are not among the known objects of the background or movement at a significant rate. If an intruder has been detected, the scanning systems typically track the location of the intruder.

Japanese Patent No. A 8055286 to Kawamoto Yuichi describes an active infra-red sensor device using a plurality of sensor poles so that the infrared rays emitted by the infrared light source of one sensor pole are detected by the next sensor pole. A disadvantage of active infra-red sensor devices is that they can only detect objects which break the beam emitted by the infrared light source between the transmitting and receiving sensor poles. Thus, to detect objects outside a perimeter boundary, the sensor poles also need to located outside.

SUMMARY OF THE PRESENT INVENTION

It is therefore an object of the present invention to provide an improved intruder detection system which includes detectors which include passive infrared sensors, a CCD camera and a light projector, which operate within a narrow angle of view.

The infrared sensors initially detect the intruder causing the camera to be switched on. If light conditions are poor, the projected is also switched on and the light beam is projected along the narrow field of view to provide sufficient illumination for the camera so as to clearly view the intruder.

It is a further object of the present invention to provide an intruder detection system which also is able to track the intruder.

There is provided, in accordance with a preferred embodiment of the present invention, a system for detecting at least one intruder into an area to be guarded. The system includes a plurality of detection units, each of the plurality of detection units having at least one infra-red sensor and having a first field of view external to and directed generally along the perimeter and located within the area to be guarded. The infra-red sensor may be a passive sensor.

Additionally, there is provided, in accordance with a preferred embodiment of the present invention, a method for detecting at least one intruder proximate to an area to be guarded having a perimeter. The method includes the following steps:

a) placing a plurality of detection units generally along the perimeter at a pre-determined distance apart and b) locating the detection units within the area to be guarded.

Each of the detection units includes at least one infra-red sensor having a first field of view.

Furthermore, in accordance with a preferred embodiment of the present invention, the detection units include a camera for recording intrusion within a second field of view and a controller. The controller includes means, responsive to output of the infra-red sensor, for determining when an intruder has entered the first field of view and activating means for activating the camera. The first field of view is narrower than the second field of view.

Furthermore, in accordance with a preferred embodiment of the present invention, the detection units additionally include a spotlight for illuminating movement within the second field of view during poor light conditions. Additionally, the spotlight may be responsive to the activation of the camera.

Furthermore, in accordance with a preferred embodiment of the present invention, the first field of view is within a range of 10°±3° and the second field of view is wider than the first field of view by an angle within a range of 2°–22°. The first field of view overlaps the field of view of the adjacent detection unit.

Additionally, in accordance with a preferred embodiment of the present invention, each of the controllers and each of the cameras is coupled to a central control and command unit.

Furthermore, in accordance with a preferred embodiment of the present invention, the central control and command unit includes a control and command system (CCS) coupled to the plurality of controllers, a digital communication channel coupled to the control and command system, a plurality of video recorders, and a plurality of video monitors. Each of the video recorders and each of the video monitors are coupled to the CCS.

Additionally, in accordance with a preferred embodiment of the present invention, the central control and command unit also includes a video motion detection unit coupled to the CCS.

Furthermore, in accordance with a preferred embodiment of the present invention, the video motion unit includes a plurality of channels, each channel coupled to the corresponding video output from one of the respective cameras.

Additionally, in accordance with a preferred embodiment of the present invention, the method also includes the steps of:

a) determining when at least one intruder has entered the first field of view;

b) activating a camera coupled to the at least one infra-red sensor, the camera having a second field of view; and c) recording images of the intrusion by the camera.

The first field of view is narrower than the second field of view.

Furthermore, in accordance with a preferred embodiment of the present invention, the method further includes the step of illuminating movement within the second field of view during poor light conditions.

Furthermore, in accordance with a preferred embodiment of the present invention, the illumination is responsive to the activation of the camera.

Furthermore, in accordance with a preferred embodiment of the present invention, the step of activating a camera when an intruder enters the first field of view, activates the camera of at least one other detection unit.

Additionally, in accordance with a preferred embodiment of the present invention, the method also includes the steps of:

a) transmitting a means of identifying the camera to a central control unit; and b) transmitting the recorded images to the central control unit.

Furthermore, in accordance with a preferred embodiment of the present invention, the method also includes the steps of recording and displaying the recorded images.

Furthermore, in accordance with a preferred embodiment of the present invention, the method also includes the control unit recognizing the activated camera.

Additionally, in accordance with a preferred embodiment of the present invention, the method also includes the step of tracking the detected intruder.

Finally, in accordance with a preferred embodiment of the present invention, the method includes the step of tracking a plurality of intrusions.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Reference is now made to FIGS. 1, 2, 3A and 3B which illustrate an intrusion detection system constructed and operative in accordance with a preferred embodiment of the present invention.

The intrusion detection system comprises at least one detection unit 10 located proximate to a perimeter 11 (such as, a security fence), of the area to be guarded. Detection unit 10 is preferably located so that the center of the field of view of unit is not along the perimeter but within the area to be protected 15.

Figure 1:
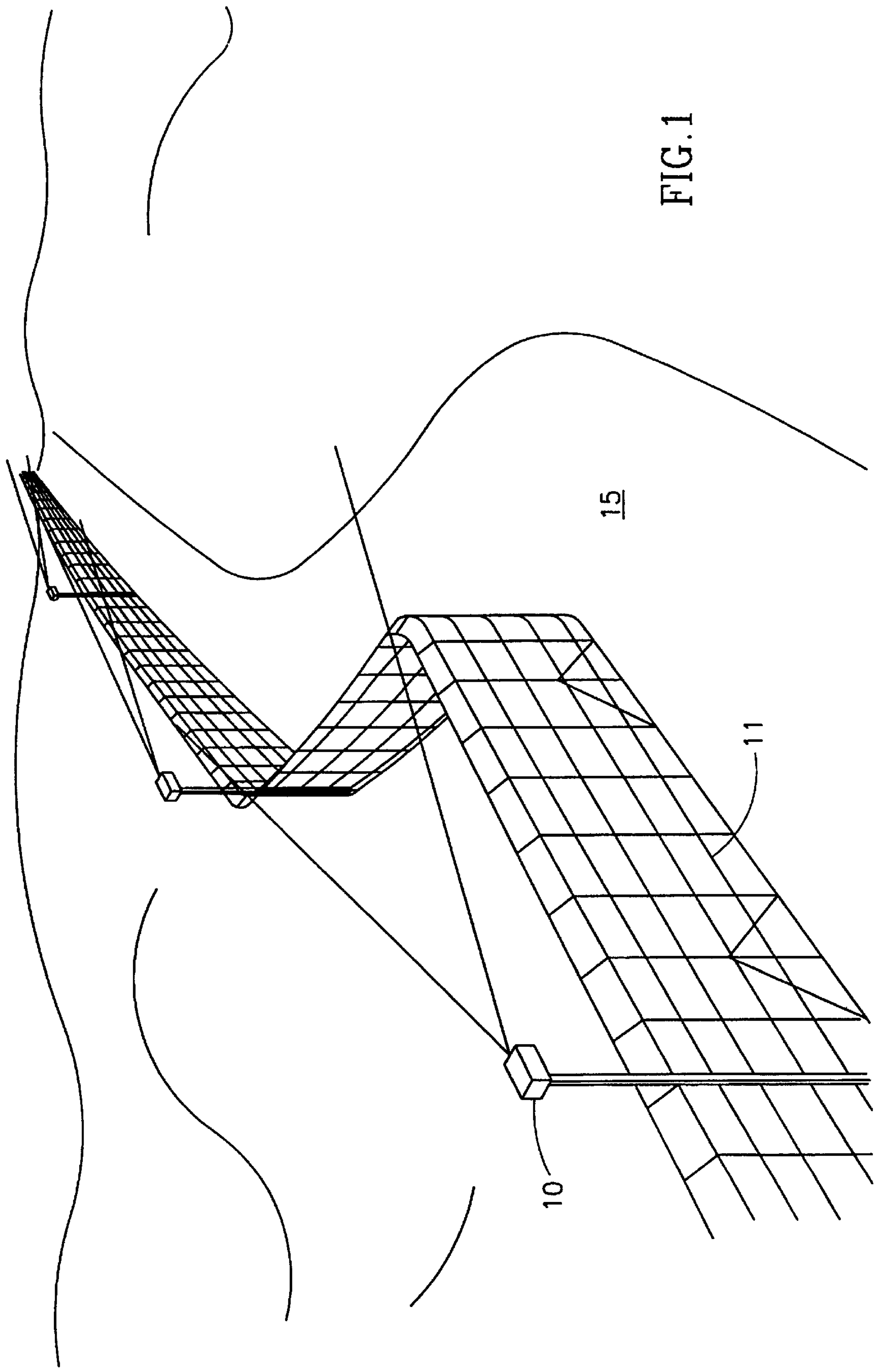
FIG. 1 is a schematic illustration of an intrusion detection system constructed and operative in accordance with a preferred embodiment of the present invention.
Figure 2B:
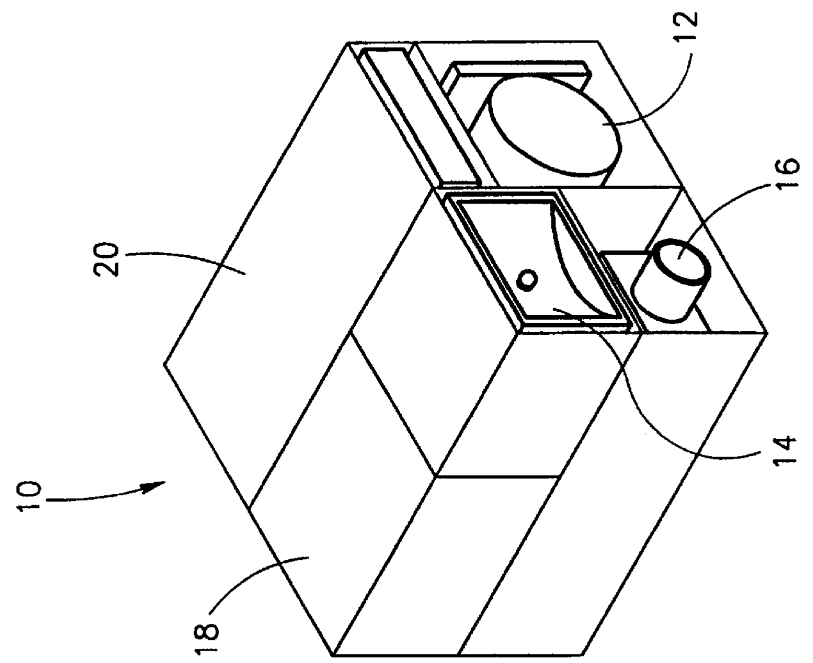
FIG. 2B is an exploded view of the detection unit of the system of FIG. 2A.
Figure 2A:
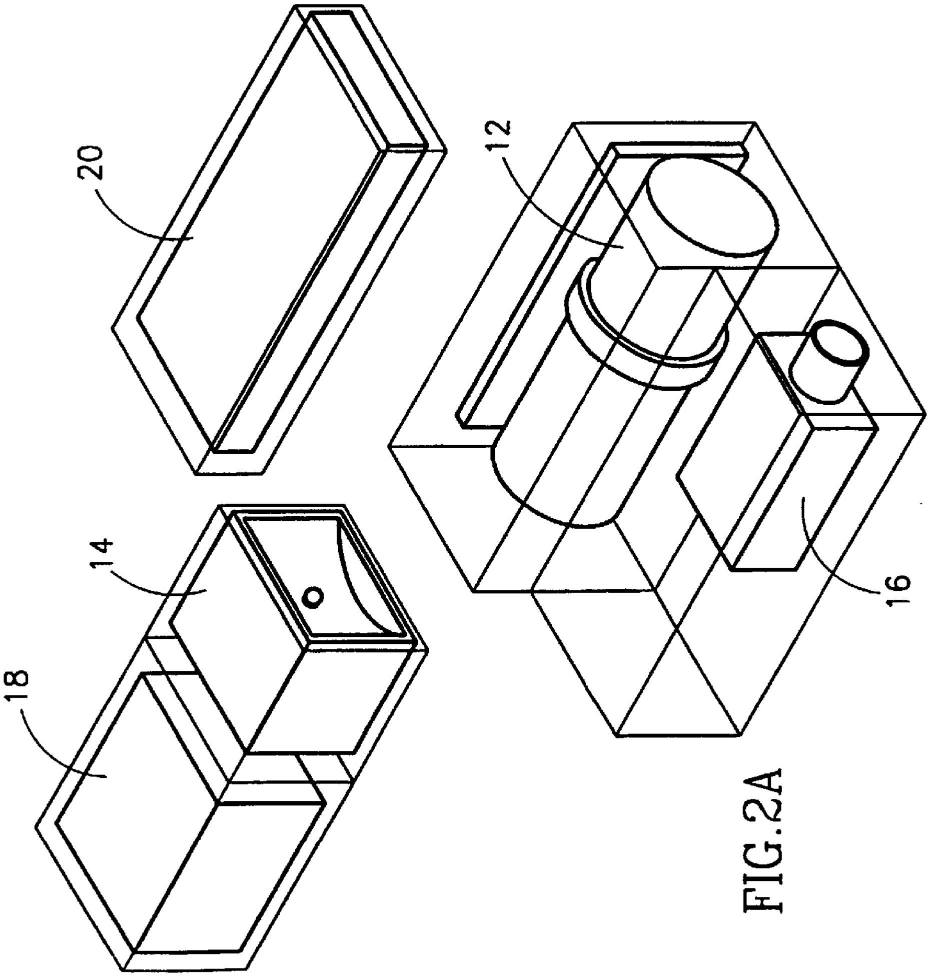
FIG. 2A is a schematic illustration of the detection unit of the system of FIG. 1.

Detection unit 10 comprises at least one passive infra-red (IR) sensor 12, a projecting spotlight 14 and a camera 16 (FIGS. 2A & 2B). Detection unit 10 further comprises a power source 18, such as battery and a controller 20.

Figure 3A:
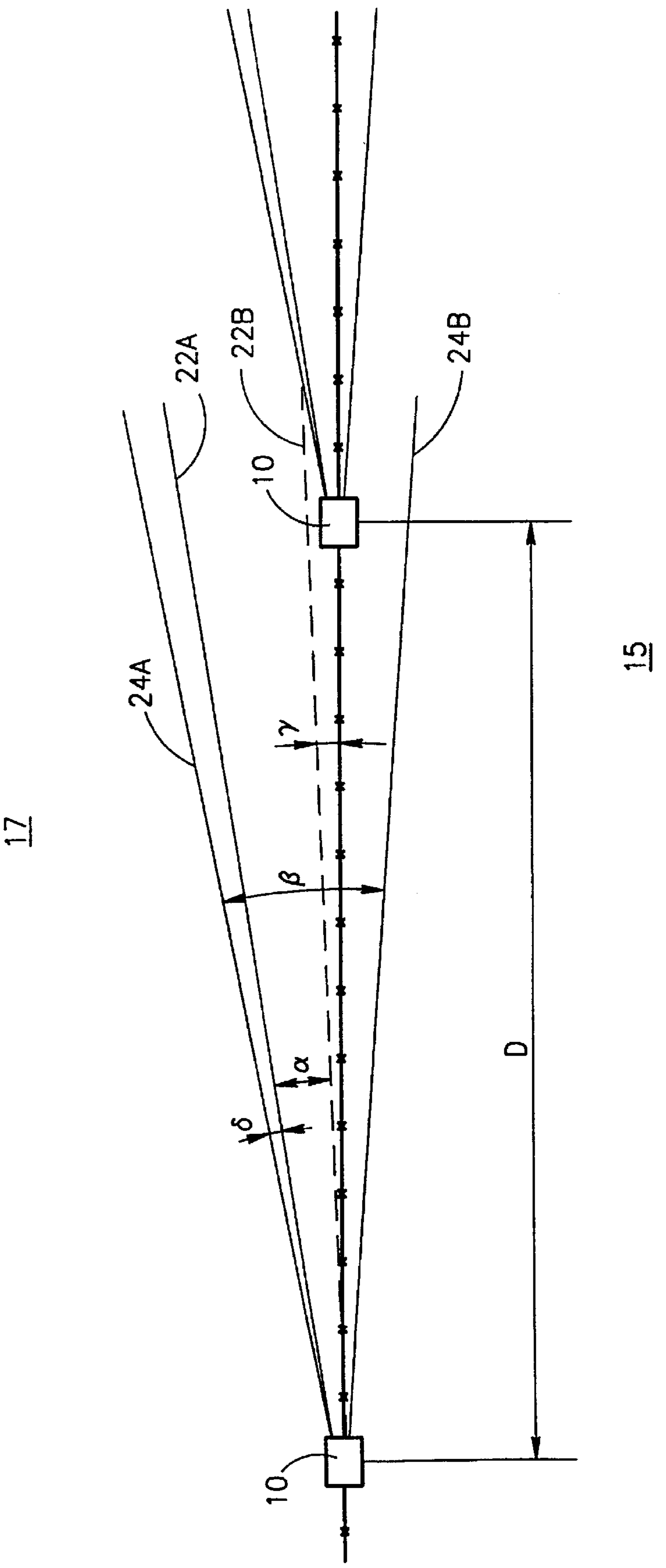
FIG. 3A is a schematic illustration in plan view of the field of view of the infra-red sensors and camera of the system of FIG. 1.

Each IR sensor 12 comprises at least one row comprising a plurality of rays 22 (designated 22*a*, 22*b*, etc. FIG. 3A). In order to cover a wider spectrum, each IR sensor 12 preferably comprises at least two rows of rays (22*a* and 22*b*). The horizontal angle a between the two rays 22*a* and 22*b* is typically 10°± (FIG. 3A). IR sensors 12 having a typical effective range of up to about 150 meters. In order to comprehensively cover an area 17, detection units 10 are preferably located at a distance D of say, approximately every 100 meters, thereby ensuring an adequate overlap between detection units 10. Typically, the angle $\gamma$ between the perimeter 11 and the ray 22*b* (closest to the perimeter 11) is ±5° from the fence 11.

Projecting spotlight 14 can be any suitable type of spotlight, known in the art, which has an affective range of at least 130 meters. The spotlight 14 may be situated at a different location from detection unit 10

The camera 16 can be any appropriate type of highly sensitive camera with fitted with lenses capable of photographing the distance of the IR sensor 12, such as a charge coupled device (CCD) camera, an infrared (IR) camera or a millimeter wave (MMW) camera. An example of a suitable camera is the Liliax PIH756 model CCD ⅓".

Controller 20, which can either be attached to the detection unit 10 or separate from it, determines from infra-red rays radiated from the body of an intruder when the intruder has entered its field of view. In accordance with a preferred embodiment of the present invention, the spotlight 14 and camera 16 are normally inactive. When an intruder is detected, the controller 20 causes the camera 16 to be operated. Spotlight 14 is only essential during the hours of dark and during poor visibility. During periods of poor light conditions, the detection of an intruder also causes the spotlight 14 to be switched on. Spotlight 14 and camera 16 are generally synchronized so as to cover the same field of view (FOV). The FOV of the camera 16 is generally wider than that of the IR sensor 12.

Controller 20 sends signals to a central control and command room (CCR) 30 (see FIG. 4) which monitors a plurality of detection units 10. The output of each camera 16 can be viewed at the central control room (CCR) 30. Controller 20 can also receive signals from the CCR.

Figure 3B:
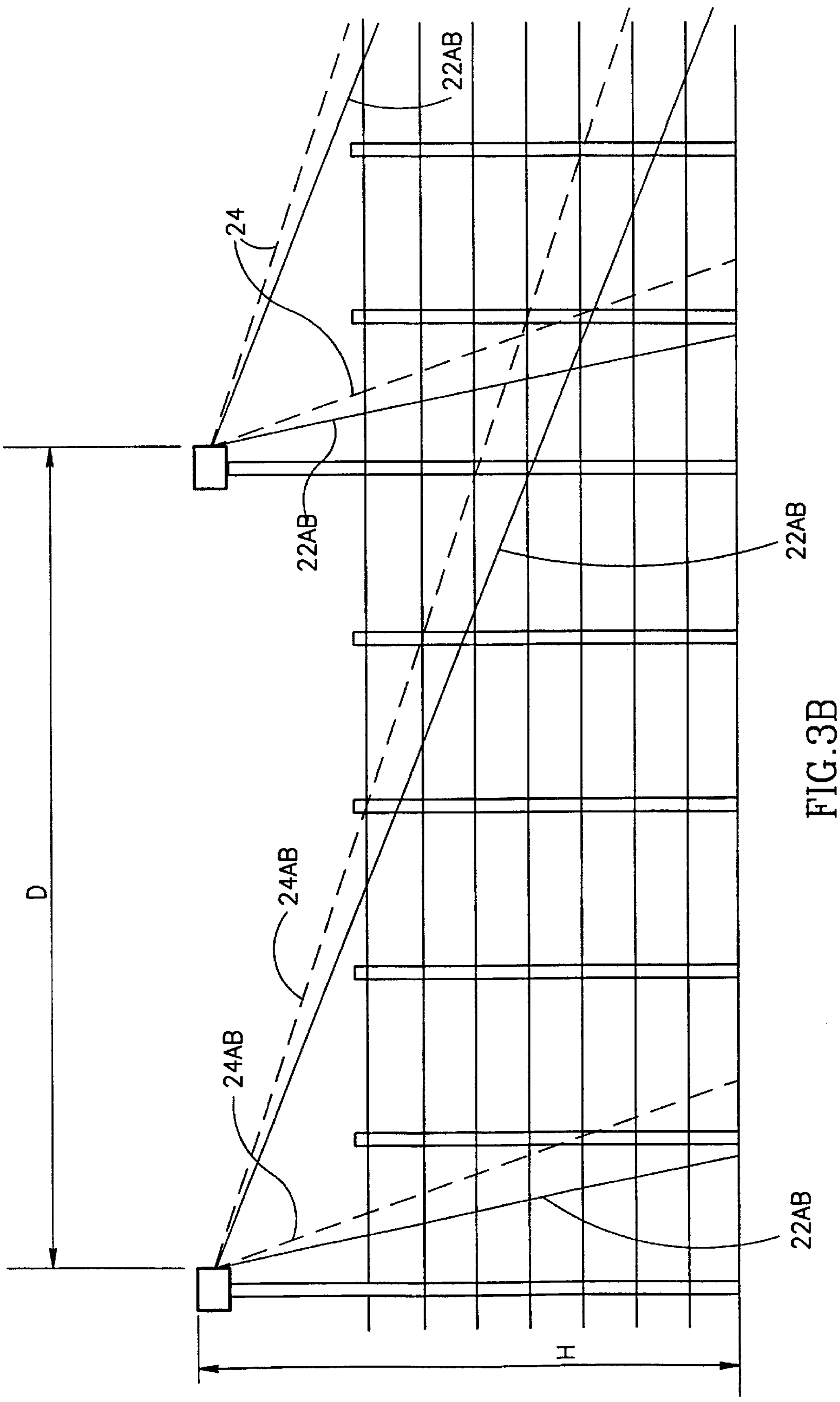
FIG. 3B is a schematic illustration in elevational view of the field of view of the infra-red sensors and camera of the system of FIG. 1.

FIGS. 3A and 3B are plan and elevational views illustrating the field of view of IR sensors 12 and camera 16, respectively for detection units 10.

The FOV of the camera 16 preferably overlaps the FOV of sensor 12. Angle $\beta$, indicating the field of view (FOV) of camera 16, is shown delineated by dashed lines 24*a* and 24*b*.

FOV angle $\beta$ is greater than angle a and lies between ray 22*b*+10° and ray 22*a*+2°. In the example shown, sensor 12 has a FOV angle $\alpha$ of 10°, FOV angle $\beta$ of camera 16 is set to 20° and angle $\gamma$ is 3°. Thus, there is an overlap of 5° on the guarded side of perimeter fence 11, the IR sensor 12 extends an angle $\delta$ (2°) beyond the camera 16.

Reference is now made to FIG. 3B, which illustrates the detection units 10 in elevational view. In the example the detection units 10 are sited at a height (H) of 4 meters above ground level in order to provide sufficient illumination for a distance in excess of the 100 meters between detection units 10.

Thus, an attempted intrusion will be detected by the IR sensors 12 close to the perimeter fence 11. The intruder will be hindered by the fence 11 and due to the spotlight 14 and camera 16, will be immediately visible on the monitors at the central control.

Figure 4:
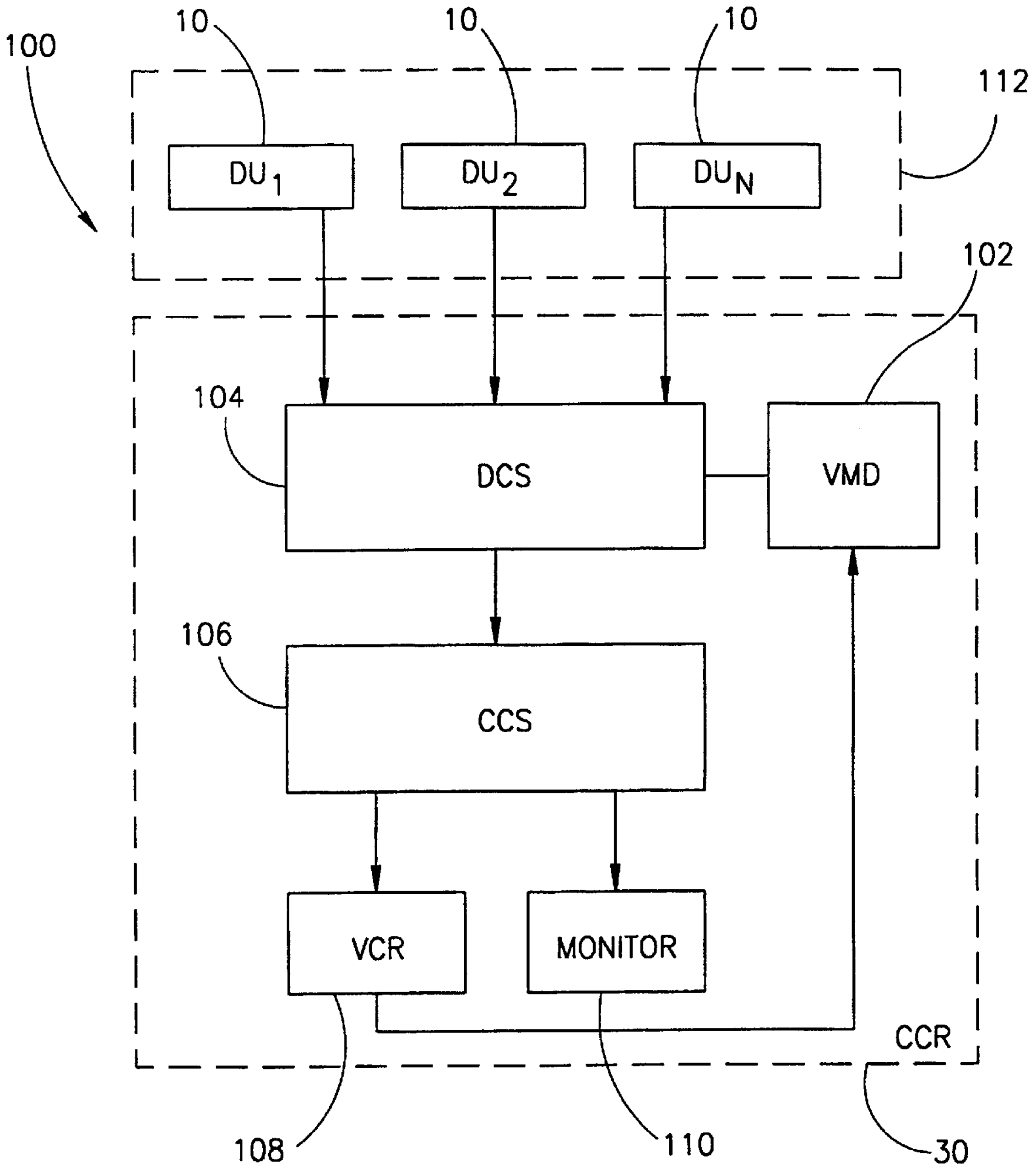
FIG. 4 is a block diagram illustration of an intrusion detection system, constructed and operative in accordance with a further preferred embodiment of the present invention.
Figure 5:
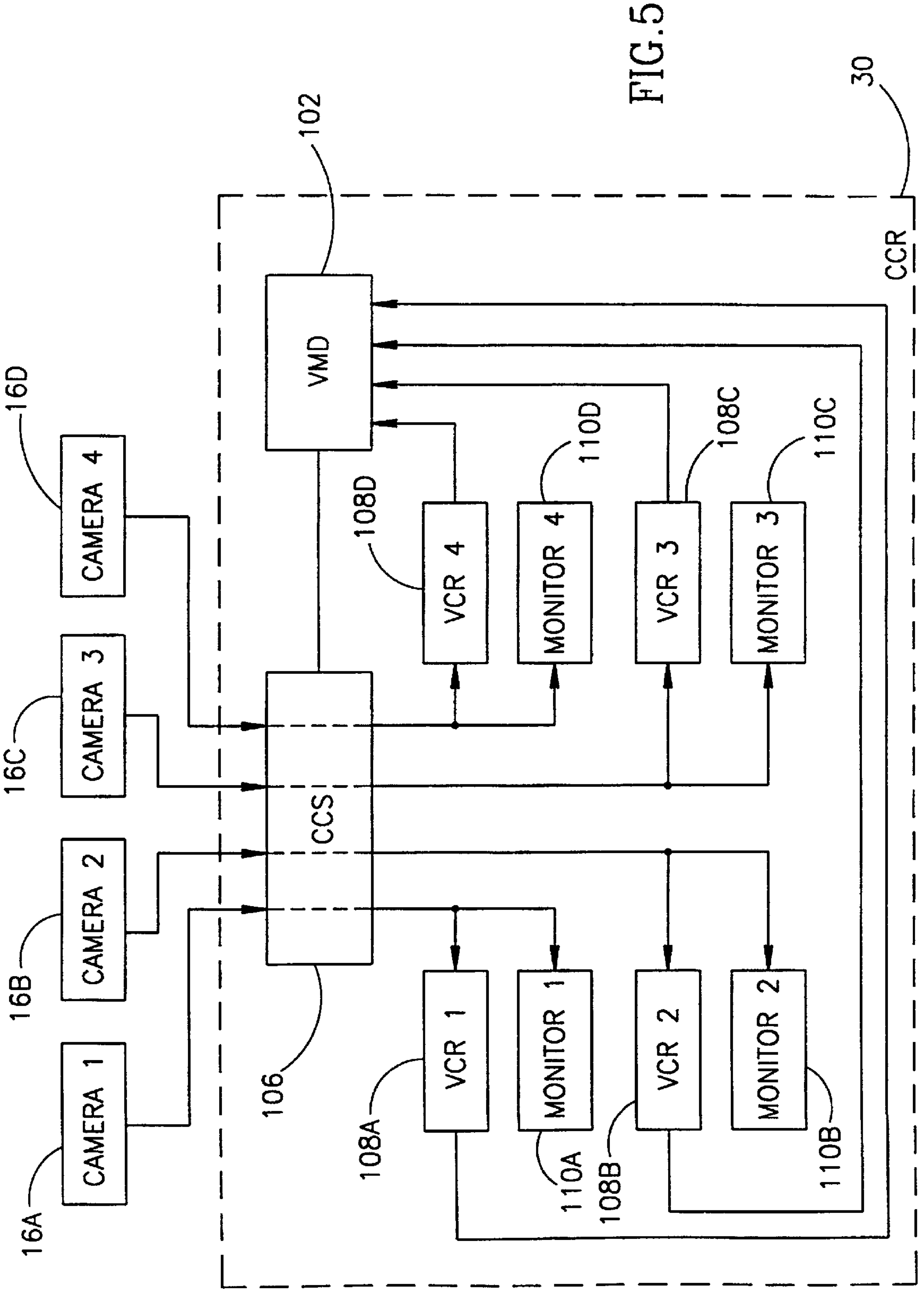
FIG. 5 is detailed block diagram illustration of the central control and command room of the intrusion detection system of FIG. 4.

Reference is now made to FIG. 4 which illustrates an intrusion detection system, generally designated 100, constructed and operative in accordance with a further preferred embodiment of the present invention. FIG. 4 is a block diagram illustration of the main components of the intrusion detection system 100. FIG. 5 is detailed block diagram illustration of the central control and command room (CCR) 30 of the intrusion detection system 100.

The intrusion detection system 100 comprises elements which are similar to elements which have been previously described with respect to the preferred embodiment hereinabove. These elements are similarly designated and will not be further described.

Intrusion detection system 100 comprises a plurality of detection units 10 (generally designated 112) located proximate to a security perimeter 11 of an area 15 to be guarded. Each detection unit 10 comprises at least one passive infra-red (IR) sensor 12, a projecting spotlight 14, a camera 16, a power source 18 (such as battery) and a controller 20 (FIGS. 2A & 2B). Controller 20 sends signals to the central control and command room (CCR) 30 which monitors the plurality of detection units 10.

Intrusion detection system 100 further comprises a video motion detector (VMD), generally designated 102 located in the CCR 30. The central control and command room (CCR) 30 comprises a digital communication channel (DCS) 104, a control and command system (CCS) 106, a plurality of video recorders (VCR) 108 and a plurality of video monitors 110.

The control and command system (CCS) 106 manages each of the plurality of the controllers 20. Each of the camera video outputs are connected through a four video line connection to the CCS 106 which controls the plurality of cameras 16, through digital communication channel (DCS) 104.

Video motion detector (VMD) 102 comprises a plurality of channels, each of which serves one of the video channel from one of the cameras 16. VMD 102 is any known in the art system for tracking the movement of a subject. Briefly, the VMD maintains a record of the setup for each camera. The setup parameters include the area of interest (AOI) for each camera taken during the night and day. Preferably, the night AOI will be a view of the whole line.

Preferably, the setup parameters for each camera also include the maximum and minimum object size, the time period of the AOI, the entry and exit points and destination of movement.

The addition of video motion detector 102 together with the VCRs 108 enables the command and control room 30 to graphically track an intruder and to maintain a visual record of intrusions.

When an intrusion occurs, activating the IR sensor 12, the corresponding camera 16 is activated. The camera transmits its identity number and begins transmitting video pictures. The CCS 106 recognizes the identity of the camera from the initial signal transmitted selected, The camera continues transmitting video pictures until turned off by the CCS 106 and its video output disconnected from the video line. Normally (default status), that is unless there is an intrusion, all cameras are switched off and video signals are not provided to the video channels.

At night, the necessary illumination for the cameras 16 is provided by the corresponding spotlight 14. The spotlight 14 is coupled to the camera 16 so that it operates in conjunction with the camera 16 but in order to ensure sufficient illumination, the spotlight 14 is turned on just before the camera and off just after the video output has been disconnected.

For the purposes of example only and to better describe the operation of the intrusion detection system 100, FIG. 5 illustrates the control and command system (CCS) 106 comprising four pairs of VCRs 108 and video monitors 110, for recording and displaying, respectively, the video pictures supplied by four selected cameras, referenced 16*a*, 16*b*, 16*c* and 16*d*.

Each of the four VCRs 108 and video monitors 110 is referenced with the suffix a, b, c or d, corresponding to one of the cameras 16*a*, 16*b*, 16*c* and 16*d*, respectively. Thus, VCR 108*a* and monitor 110*a* record and display, respectively, the video output from camera 16*a*.

In the example of FIG. 5, the video motion detector 102 comprises four separate channels corresponding to the video channel output from each of the four selected cameras, 16*a*, 16*b*, 16*c* and 16*d*.

Thus, when an intrusion occurs, the IR sensor 12 is activated, power supply 18 is turned on and the corresponding camera 16 activated. The camera transmits its identity number and begins transmitting video pictures. The CCS 106 recognizes the identity of the camera from the initial signal transmitted and activates one of the VCRs 108 to begin recording the video output. The output is displayed by the monitor 110 connected to the corresponding VCR. The VMD 102 tracks the intrusion.

The CCS operator has the option of activating the adjacent cameras (and spotlights, if required) in the system so as to obtain a view of activity along a greater length of the perimeter.

The addition of the VMD gives the operator an additional tool with which to decide whether an intrusion has in fact taken place.

The use of a VMD having four channels allows for the monitoring of up to four cameras simultaneously. Four cameras may be connected to a single interface card and since it is only necessary to activate the VMD when an intrusion is indicated by the activating of the IR sensor, any four cameras may be viewed at any one time. It is not essential to continuously have all the cameras activated at any one time. Thus, intrusion detection system 100 having a control and command system 106 comprising a single video motion detector (VMD) 102 with capacity for up to four video inputs can successfully maintain surveillance along a security border.

It will be appreciated by persons skilled in the art that the present invention is not limited to what has been particularly shown and described hereinabove. Rather the scope of the present invention is defined only by the claims which follow:

I claim:

1. A system for detecting at least one intruder proximate to an area to be guarded, said area having a perimeter, the system comprising:

a. a plurality of detection units, each of which includes at least one passive infra-red sensor having a first field of view external to and directed generally along said perimeter, said plurality of detection units, being positioned within the area to be guarded, creating a preemptive detection zone external to said perimeter for detecting said at least one intruder before said at least one intruder reaches said perimeter; and b. at least one camera for viewing and recording said at least one intruder within a second field of view, said second field of view being wider than said first field of view.

2. A system according to claim 1 and further comprising:

a. a controller, responsive to output of said at least one passive infra-red sensor, for communicating with a central control and command unit when said at least one intruder has entered said first field of view; and b. an operator activating said at least one camera.

3. A system according to claim 1, and wherein each of said plurality of detection units additionally comprises a spotlight for illuminating movement within said second field of view during poor light conditions.

4. A system according to claim 2 wherein each of said plurality of detection units additionally comprises a spotlight, for illuminating movement within said second field of view during poor light conditions, said spotlight is responsive to the activation of said at least one camera.

5. A system according to claim 1 wherein said first field of view is within a range of 10°±3°.

6. A system according to claim 1 wherein said second field of view is wider than said first field of view by an angle within a range of 2°–22°.

7. A system according to claim 1 and wherein said first field of view of a first one of said plurality of detection units overlaps said first field of view of a second one of said plurality of detection units, said first and second detection units being adjacent detection units.

8. A system according to claim 2 and wherein each of said at least one cameras is activated by said central control and command unit.

9. A system according to claim 8 and wherein said central control and command unit comprises:

a. a control and command system coupled to a plurality of said at least one camera;

b. a digital communication channel coupled to said control and command system, for controlling the plurality of said cameras;

c. a plurality of video recorders, each of which is coupled to said control and command system, each video recorder recording the output from one of the respective cameras; and d. a plurality of video monitors, each of which is coupled to said control and command system, each monitor displaying the output from one of the respective cameras.

10. A system according to claim 9 and wherein said central control and command unit further comprises a video motion detection unit coupled to said control and command system.

11. A system according to claim 10 and wherein said video motion unit comprises a plurality of channels, each channel is coupled to a corresponding video output from one of the respective cameras.

12. A method for detecting at least one intruder before said at least one intruder reaches the perimeter of an area to be guarded, the method comprising of:

a. placing a plurality of detection units within said area to be guarded, each of said plurality of detection units including at least one passive infra-red sensor having a first field of view external to and directed generally along said perimeter at a pre-determined distance apart, the plurality of detection units thereby creating a pre-emptive detection zone external to said perimeter for detecting said at least one intruder;

b. communicating an intrusion to a central control and command unit; and c. activating a camera for viewing and recording said at least one intruder, said camera having a second field of view; said second field of view being wider than said first field of view.

13. A method according to claim 12 wherein said activating said camera is controlled by said central control and command unit.

14. A method according to claim 12 and further comprising illuminating movement within said second field of view during poor light conditions.

15. A method according to claim 14 wherein said illuminating is responsive to said activating of said camera.

16. A method according to claim 12 and wherein said activating said camera when an intruder has entered said first field of view, activates a camera of at least one other detection unit.

17. A method according to claim 13 further comprising:

a. transmitting an identifier for said camera to a central control unit; and b. transmitting said recording to said central control unit.

18. A method according to claim 12 and further comprising displaying said recording images.

19. A method according to claim 12 and further comprising recognizing said activated camera.

20. A method according to claim 12 and further comprising tracking said detected intruder.

21. A method according to claim 12 and further comprising tracking a plurality of intrusions.

* * * * *